(12) United States Patent
Kang

(10) Patent No.: US 8,363,352 B2
(45) Date of Patent: Jan. 29, 2013

(54) MOTOR AND RECORDING DISC DRIVE APPARATUS

(75) Inventor: Sang Sun Kang, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/926,294

(22) Filed: Nov. 8, 2010

(65) Prior Publication Data

US 2011/0304937 A1  Dec. 15, 2011

(30) Foreign Application Priority Data

Jun. 15, 2010  (KR) .................. 10-2010-0056462

(51) Int. Cl.
*G11B 17/02* (2006.01)
(52) U.S. Cl. ................................. 360/99.08
(58) Field of Classification Search ............. 360/99.08; 310/90
See application file for complete search history.

(56) References Cited

U.S. PATENT DOCUMENTS

| | | | |
|---|---|---|---|
| 6,512,315 B1* | 1/2003 | Yamaguchi | 310/51 |
| 6,890,104 B2* | 5/2005 | Gomyo et al. | 384/119 |
| 7,015,611 B2* | 3/2006 | Tokunaga et al. | 310/90 |
| 7,372,663 B2* | 5/2008 | Leblanc et al. | 360/99.08 |
| 8,238,055 B2* | 8/2012 | Kim et al. | 360/99.08 |
| 2002/0181151 A1* | 12/2002 | Obata et al. | 360/99.08 |
| 2003/0235007 A1* | 12/2003 | Parsoneault | 360/99.08 |
| 2004/0008912 A1* | 1/2004 | Gomyo et al. | 384/100 |
| 2005/0099722 A1* | 5/2005 | Nishimura et al. | 360/99.08 |
| 2005/0207060 A1* | 9/2005 | Leblanc et al. | 360/99.08 |
| 2006/0176611 A1* | 8/2006 | Flores et al. | 360/99.08 |
| 2007/0206890 A1* | 9/2007 | Kim | 384/119 |
| 2007/0217064 A1* | 9/2007 | Wakitani et al. | 360/99.08 |
| 2007/0252461 A1* | 11/2007 | Komori | 310/90 |
| 2008/0067890 A1* | 3/2008 | Tamaoka | 310/272 |
| 2011/0122529 A1* | 5/2011 | Hamakawa et al. | 360/99.08 |

FOREIGN PATENT DOCUMENTS

| | | |
|---|---|---|
| JP | 2000-120690 | 4/2000 |
| JP | 2008-69805 | 3/2008 |
| KR | 10-2004-0072578 | 8/2004 |

OTHER PUBLICATIONS

Korean Office Action issued Apr. 28, 2011 in corresponding Korean Patent Application 10-2010-0056462.

* cited by examiner

*Primary Examiner* — Allen Cao

(57) ABSTRACT

Disclosed are a motor and a recording disc drive apparatus that can prevent a fluid in a fluid dynamic bearing from being discharged to the outside. A motor according to an aspect of the invention may include: a shaft; a sleeve having a cylindrical shape and supporting the shaft such that the shaft is rotatable therein; a rotor case engaged with an upper end of the shaft and having a rotor main wall having a cylindrical shape and protruding from one surface thereof in order to receive part of the sleeve; and a cover engaged with an end portion of the rotor main wall and extending the rotor main wall, wherein at least two sealing portions preventing leaks of a fluid used to lubricate the sleeve are formed between an internal circumferential surface, defined by the rotor main wall and the cover, and an outer circumferential surface of the sleeve.

11 Claims, 5 Drawing Sheets

MOTOR AND RECORDING DISC DRIVE APPARATUS

CROSS-REFERENCE TO RELATED APPLICATIONS

This application claims the priority of Korean Patent Application No. 10-2010-0056462 filed on Jun. 15, 2010, in the Korean Intellectual Property Office, the disclosure of which is incorporated herein by reference.

BACKGROUND OF THE INVENTION

1. Field of the Invention

The present invention relates to a motor and a recording disc drive apparatus, and more particularly, to a motor and a recording disc drive apparatus that can prevent fluid from a fluid pressure bearing from being discharged to the outside.

2. Description of the Related Art

A small-sized spindle motor, which is used in a recording disc drive apparatus, uses a fluid dynamic bearing assembly. While oil is interposed between a shaft and a sleeve of the fluid dynamic bearing assembly, the shaft is supported by fluid pressure generated by the oil.

As for a recent recording disc drive apparatus, as a shaft is rotated at high speed, oil may flow from the inside to the outside of the fluid pressure bearing assembly. Research into oil sealing has been conducted in order to solve the overflow problem.

In the related art, in a fluid pressure bearing assembly, an upper or lower end of a shaft hole in a sleeve, into which a shaft is inserted, is tapered, thereby allowing for taper sealing of oil.

However, the above-described taper sealing method according to the related art causes a reduction in a bearing span of the shaft, and thus, the shaft fails to stably support a rotor.

SUMMARY OF THE INVENTION

An aspect of the present invention provides a motor and a recording disc drive apparatus that forms a plurality of sealing portions to prevent oil from leaking from the inside to the outside of a bearing assembly.

According to an aspect of the present invention, there is provided a motor including: a shaft; a sleeve having a cylindrical shape and supporting the shaft such that the shaft is rotatable therein; a rotor case engaged with an upper end of the shaft and having a rotor main wall having a cylindrical shape and protruding from one surface thereof in order to receive part of the sleeve; and a cover engaged with an end portion of the rotor main wall and extending the rotor main wall, wherein at least two sealing portions preventing leaks of a fluid used to lubricate the sleeve are formed between an internal circumferential surface, defined by the rotor main wall and the cover, and an outer circumferential surface of the sleeve.

The at least two sealing portions may be provided in a straight line.

The sleeve, received in the rotor mail wall, may increase in outside diameter in an upper axial direction.

The at least two sealing portions may include: a first sealing portion including a space between the rotor main wall and the sleeve; and a second sealing portion including a space between the cover and the sleeve.

The first sealing portion may be a space formed by a first sealing recess provided in any one of the sleeve and the rotor main wall.

The second sealing portion may be a space formed by a second sealing recess provided in any one of an inclined portion of the sleeve and the cover.

The first sealing recess may increase in depth toward a lower part thereof.

The second sealing recess may increase in depth toward a lower part thereof.

The at least two sealing portions may each include at least one extension recess provided in at least any one of the outer circumferential surface of the sleeve and the internal circumferential surface, defined by the rotor main wall and the cover, in order to extend respective spaces of the sealing portions.

The cover may be formed of a transparent material.

According to an aspect of the present invention, there is provided a recording disc drive apparatus including: any one of the above-described motors; a head transfer unit transferring a head detecting information on a recording disc to be mounted on the motor to the recording disc; and a housing receiving the motor and the head transfer unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
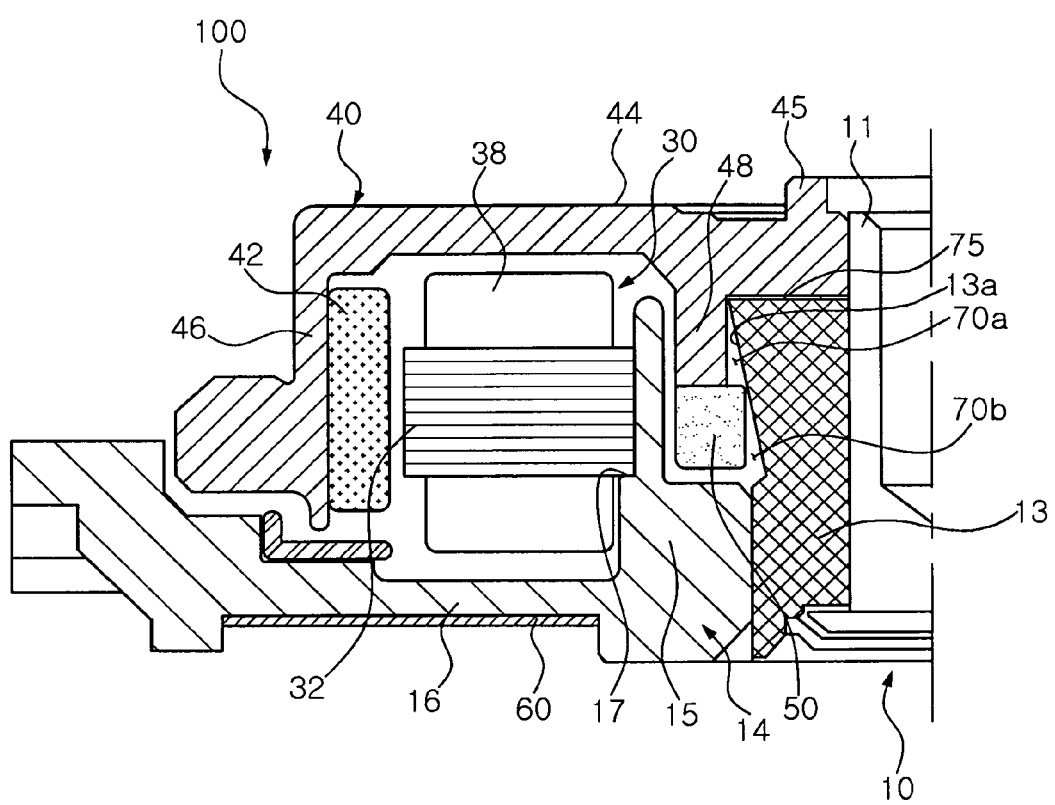
FIG. 1 is a schematic sectional view illustrating a motor according to an exemplary embodiment of the present invention.

Prior to a detailed description of the present invention, the terms and words, which are used in the specification and claims to be described below, should not be construed as having typical or dictionary meanings. The terms and words should be construed in conformity with the technical idea of the present invention on the basis of the principle that the inventors can appropriately define terms in order to describe their invention in the best way. Embodiments described in the specification and structures illustrated in drawings are merely exemplary embodiments of the present invention. Thus, it is intended that the present invention cover the modifications and variations of this invention, provided they fall within the scope of their equivalents at the time of filing this application.

Exemplary embodiments of the present invention will be described in detail with reference to the accompanying drawings. The same reference numerals will be used throughout to designate the same or like components in the accompanying drawings. Moreover, detailed descriptions related to well-known functions or configurations will be ruled out in order not to unnecessarily obscure subject matters of the present invention. In the drawings, the size and dimensions of some components may be exaggerated, omitted or schematically illustrated. Also, the size of each element does not entirely reflect an actual size.

Exemplary embodiments of the present invention will now be described in detail with reference to the accompanying drawings.

Terms regarding directions are defined as follows. A shaft direction refers to a vertical direction on the basis of a shaft 11 with reference to FIG. 1, and an inside or outside diameter direction refers to an outer end direction of a rotor 40 on the basis of the shaft 11 or a central direction of the shaft 11 on the basis of an outer end of the rotor 40.

Hereinafter, exemplary embodiments of the present invention will now be described in detail with reference to the accompanying drawings.

Figure 2:
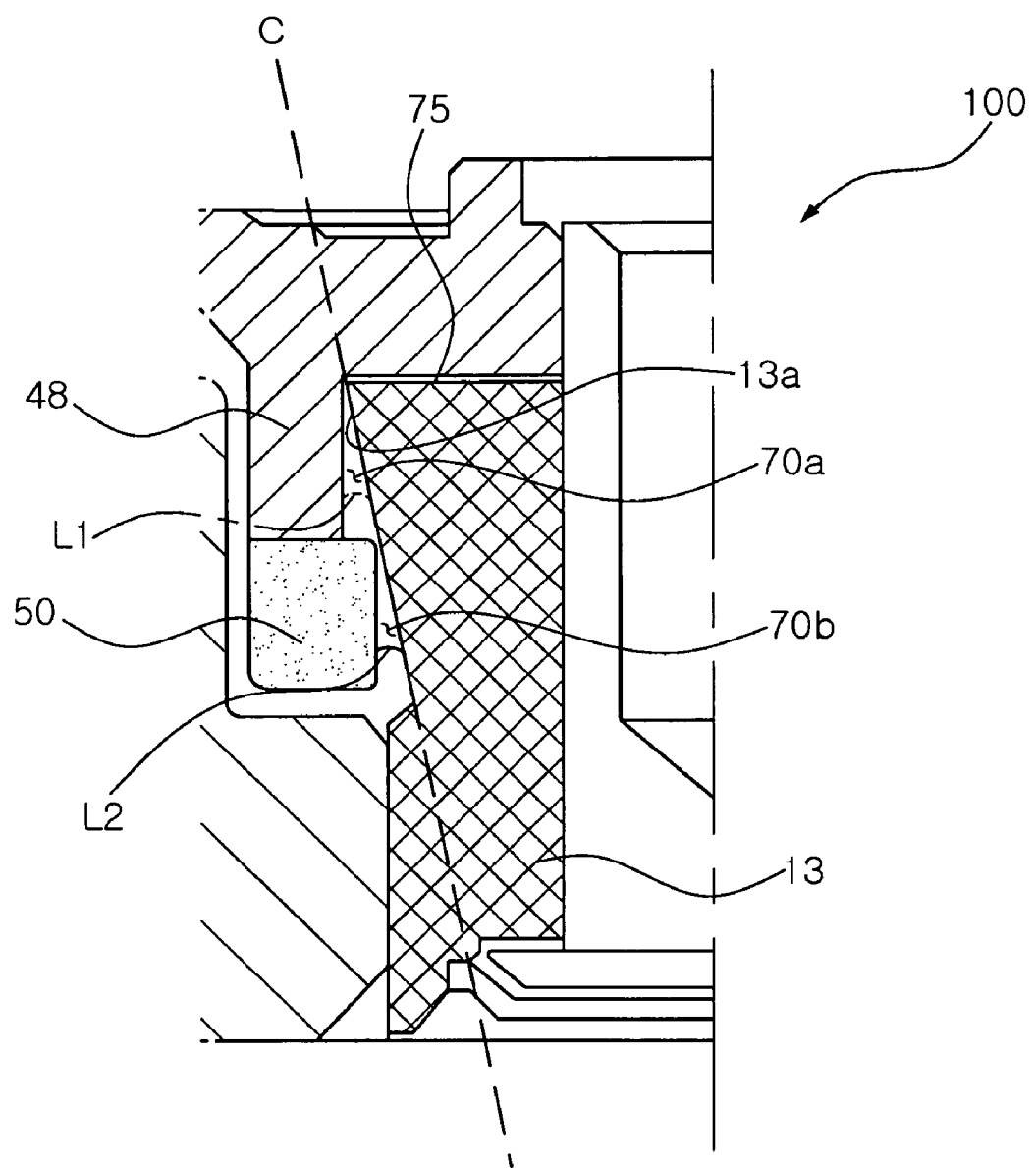
FIG. 2 is an enlarged sectional view illustrating a sealing portion of FIG. 1.

FIG. 1 is a schematic sectional view illustrating a motor according to an exemplary embodiment of the invention. FIG. 2 is an enlarged sectional view illustrating sealing portions of FIG. 1.

Referring to FIGS. 1 and 2, a motor 100 according to this embodiment is a spindle motor that is applied to a hard disk drive (HDD) and includes a bearing assembly 10, a stator 30, and a rotor 40.

The bearing assembly 10 includes a shaft 11, a sleeve 13 and a base 14 having a circuit board 60 attached thereto.

The shaft 11 forms a rotary axis of the rotor 40 to be described below.

The sleeve 13 is a rotation support member that has a hole, into which the shaft 11 is inserted, and supports the shaft 11 by forming an oil film between the sleeve 13 and the shaft 11 so that the shaft 11 can easily be rotated therein. A plurality of radial dynamic recesses (not shown) that generate fluid dynamic pressure may be formed in one side of an outside diameter portion of the shaft 11 or an inside diameter portion of the sleeve 13. Here, a fluid may be filled between the sleeve 13 and the shaft 11. As the fluid serves as a lubricant, the fluid reduces the friction between the sleeve 13 and the shaft 11 during rotation. An outer circumferential surface of the sleeve 13 is pressed and inserted into the base 14 to be described below so that the sleeve 13 is fixed to the base 14.

Part of the sleeve 13 according to this embodiment, which is received in a rotor main wall 48 to be described below, increases in outside diameter upward along the axial direction. That is, the outside diameter of the part of the sleeve 13 is increased towards a top end thereof. Therefore, the outer circumferential surface of the sleeve 13 according to this embodiment is partially inclined. Hereinafter, the partially inclined portion is referred to as an "inclined portion 13a."

The base 14 is a support member that supports the entirety of components of the motor. In particular, the base 14 includes a sleeve support portion 15 that rotatably supports the shaft 11 by the medium of sleeve 13 and a plate portion 16 that has a lower surface to which a circuit board 60 to be described below is attached. The sleeve support portion 15 has a cylindrical shape, and the sleeve 13 and the shaft 11 are inserted into the sleeve support portion 15. The stator 30 to be described below is mounted on an outer circumferential surface of the sleeve support portion 15. To this end, the outer circumferential surface of the sleeve support portion 15 has a mounting portion 17 that partially protrudes in the outside diameter direction to thereby form a step.

The circuit board 60 has circuit patterns (not shown) therein to apply power to the motor 100. The circuit board 60 is electrically connected to a winding coil 38 and applies power to the winding coil 38. Also, ground patterns among the circuit patterns of the circuit board 60 may be electrically connected to the base 14. As for the circuit board 60, various kinds of boards, such as a general printed circuit board (PCB) or a flexible PCB, may be used upon necessity.

The stator 30 includes a core 32, which is formed by stacking a plurality of iron plates, and the winding coil 38 wound around an outer circumferential surface of the core 32. The stator 30 is a stationary part that is received inside the rotor 40.

The winding coil 38 is wound around the core 32 to be described below and generates electromagnetic force when power is applied. The winding coil 38 according to this embodiment is electrically connected to the circuit board 60 through a conducting wire (not shown) and is thereby supplied with external power. However, the present invention is not limited thereto. Various configurations are allowed as long as the circuit board 60 and the winding coil 38 are electrically connected to each other.

The rotor 40 includes a magnet 42 and a rotor case 44.

The magnet 42 is an annular permanent magnet that has magnetic north and south poles magnetized alternately in the circumferential direction to thereby generate a magnetic force having a predetermined magnitude.

The rotor case 44 is shaped like a cup and includes a rotor hub 45, a magnet coupling portion 46, and the rotor main 48.

The rotor hub 45 is engaged with an upper end of the shaft 11.

The magnet 42 is engaged with the magnet coupling portion 46, which is formed along an inner circumferential surface of the rotor case 44. Here, the magnet 42 is disposed to face the core 32 of the stator 30 to be described below. Therefore, when power is applied to the winding coil wound around the core 32, the rotor 40 is rotated by the interaction between the magnet 42 and the winding coil 38.

The rotor main wall 48 has a cylindrical shape and protrudes from one surface, that is, a lower surface of the rotor case 44. The rotor main wall 48 is formed to receive approximately a third of an upper part of the sleeve 13. The rotor main wall 48 and a cover 50 to be described below form first and second sealing portions 70a and 70b according to an exemplary embodiment of the invention. This will be described in more detail when a description is made to the first and second sealing portions 70a and 70b.

The cover 50 is engaged with the end of the rotor main wall 48 and extends the rotor main wall 48. The cover 50 according to this embodiment has a ring shape and a square cross-section so that the outer edges thereof are angulated. The cover 50 may be bonded to the end of the rotor main wall 48 through an adhesive or the like.

Furthermore, the cover 50 is bonded to the rotor main wall 48 such that portion of the cover 50 is projected from the rotor main wall 48 in the inside diameter direction. Here, the cover 50 according to this embodiment is bonded to the rotor main wall 48 so that the edge of the projected portion may be very adjacent to the outer circumferential surface of the sleeve 13. Here, the above-described edge may be angulated as shown in FIG. 1. However, the edge may be curved so that a larger surface of the cover 50 may be adjacent to the outer circumferential surface of the sleeve 13.

The cover 50 is provided in order to form the second sealing portion 70b to be described below. Furthermore, the cover 50 according to this embodiment may be formed of a transparent material. As the cover 50 is transparent, it is possible to check the movement of the fluid, which is injected between the sleeve 13 and the shaft 11, with the naked eye.

The motor 100 according to this embodiment that has the above-described configuration has a passage (hereinafter, referred to as a "fluid passage 75") through which the fluid is moved via a gap created between an upper end surface of the sleeve 13 and a lower surface of the rotor case 44. When the fluid, injected between the sleeve 13 and the shaft 11, is expanded, the fluid flows into the fluid passage 75 and moves along. The first and second sealing portions 70a and 70b are formed in the end of the fluid passage 75.

Here, according to this embodiment of the invention, at least two first and second sealing portions 70a and 70b are formed between an inner circumferential surface, defined by the rotor main wall 48 and the cover 50, and the outer circumferential surface of the sleeve 13.

The first and second sealing portions 70a and 70b prevent the leaks of the fluid that is used to lubricate the sleeve 13. The motor 100 according to this embodiment includes the first sealing portion 70a and the second sealing portion 70b that are continuously formed. In particular, the first sealing portion 70a and the second sealing portion 70b according to this embodiment are formed in a straight line C in FIG. 2 along the inclined surface of the sleeve 13.

The first sealing portion 70a is a space created between the rotor main wall 48 and the inclined portion 13a of the sleeve 13. That is, the first sealing portion 70a is a space defined by the rotor main wall 48 projected vertically downward from the rotor case 44 and the inclined surface of the sleeve 13. As for the first sealing portion 70a, an interval between the rotor main wall 48 and the outer circumferential surface of the sleeve 13 gradually increases in a downward direction due to the inclined portion 13a of the sleeve 13. As the fluid, leaked through the fluid passage 75, reaches the first sealing portion 70a, an interface of the fluid is formed due to the increased space of the first sealing portion 70a, the fluid can thereby be sealed (or taper sealed).

The second sealing portion 70b is a space created between the cover 50 and the inclined portion 13a of the sleeve 13. That is, the second sealing portion 70b is formed by a space defined by the cover 50 that extends the rotor main wall 48 and is engaged with the rotor main wall 48 and the inclined portion 13a of the sleeve 13. In the same manner as the first sealing portion 70a, as for the second sealing portion 70b, an interval between the cover 50 and the outer circumferential surface of the sleeve 13 gradually increases due to the inclined surface of the sleeve 13. Therefore, as the fluid, leaked from the first sealing portion 70a, reaches the second sealing portion 70b, an interface of the fluid is formed due to the increased space of the second sealing portion 70b so that the fluid may be sealed (or taper sealed).

A method of sealing the fluid, leaking through the fluid passage 75, from the motor 100 according to this embodiment will now be described.

When the fluid leaks, the fluid leak is first introduced into the first sealing portion 70a. The fluid, flowing into the first sealing portion 70a, forms an interface L1, as shown in FIG. 2, in the first sealing portion 70a so that the fluid leak is sealed.

Also, while the interface L1 of the fluid is formed in the first sealing portion 70a, if an external impact is applied thereto or the fluid inside the sleeve 13 is further leaked, the fluid may further leak from the first sealing portion 70a. The fluid, leaking from the first sealing portion 70a, flows into the second sealing portion 70b. The fluid, flowing into the second sealing portion 70b, forms an interface L2, as shown in FIG. 2, in the second sealing portion 70b, the fluid leak is thereby sealed again.

In the motor 100 according to this embodiment, even when the fluid leaks and is located in the first and second sealing portions 70a and 70b, the fluid is sucked into the fluid passage 75 again along the inclined portion 13a of the sleeve 13 by centrifugal force being exerted upon the rotation of the rotor 40.

As described above, the motor 100 according to this embodiment doubly seals the fluid through the first sealing portion 70a and the second sealing portion 70b, which are continuously arranged in a straight line, it is possible to more effectively prevent fluid leaks to the outside of the sleeve 13.

The first and second sealing portions 70a and 70b of the motor 100 having the above-described configuration may have various kinds of configurations.

Sealing portions and a motor having the same according to exemplary embodiments to be described below are configured to have structures similar to the motor 100, as shown in FIG. 1, except for the shapes of the sealing portions. Therefore, a detailed description of the same components is omitted, and the sealing portions will be described in detail.

Figure 3:
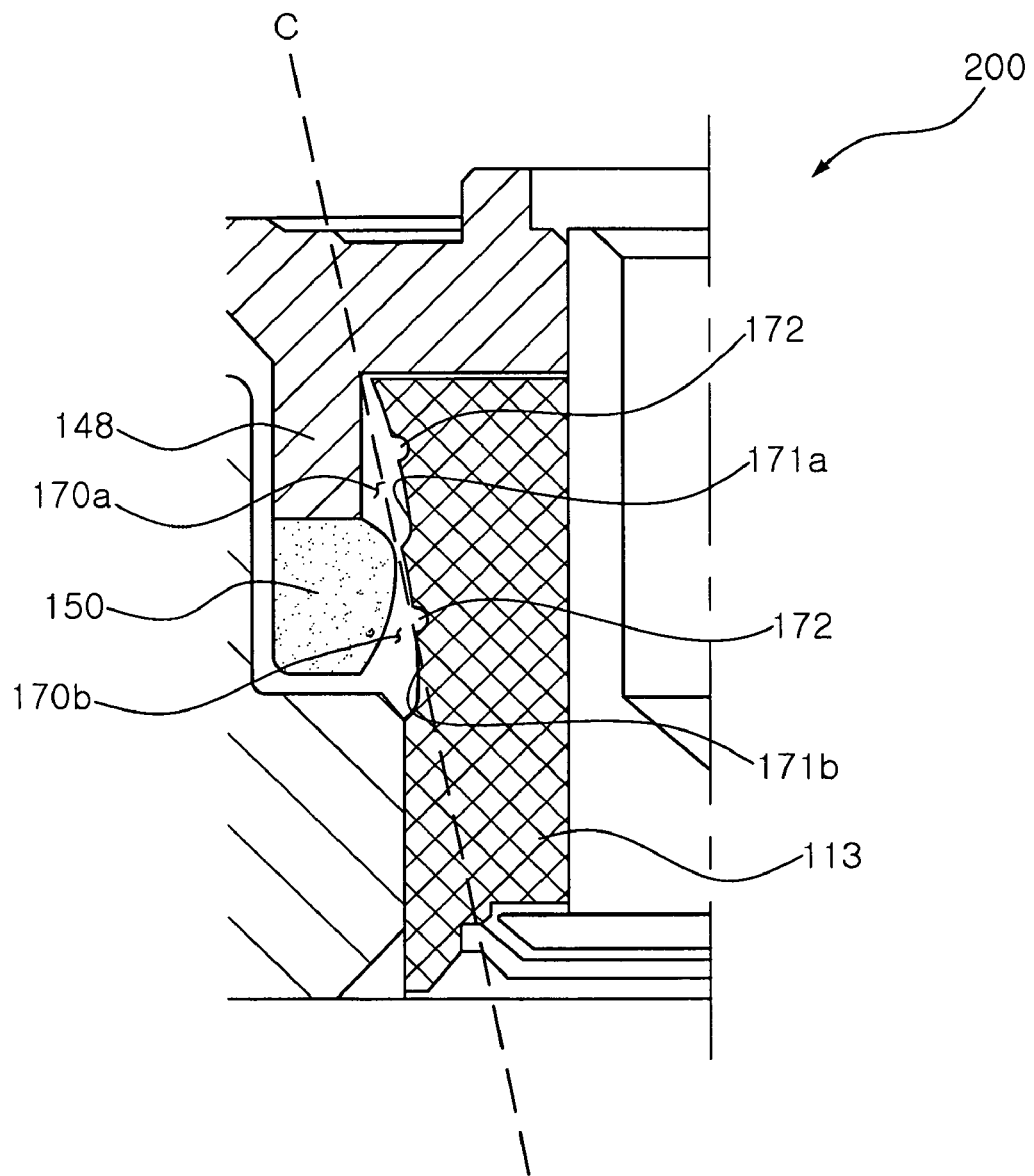
FIG. 3 is a schematic sectional view illustrating a motor according to another exemplary embodiment of the present invention.

FIG. 3 is a schematic sectional view illustrating a motor according to another exemplary embodiment of the invention.

A motor 200 according to this embodiment is different from the motor 100, as shown in FIG. 1, in terms of the shapes of the outer circumferential surface of the sleeve 113 and the cover 150.

The sleeve 113 according to this embodiment has the inclined portion 13a, as shown in FIG. 1. A first sealing recess 171a and a second sealing recess 171b are formed on the outer circumferential surface of the inclined portion 13a. The first sealing recess 171a and the second sealing recess 171b are recesses that are formed to ensure spaces forming a first sealing portion 170a and a second sealing portion 170b, respectively. The first sealing recess 171a and the second sealing recess 171b are continuously formed along the outer circumferential surface of the sleeve 113.

Each of the first sealing recess 171a and the second sealing recess 171b increases in depth downward along the axial direction. For this reason, the first sealing portion 170a and the second sealing portion 170b have spaces whose lower portions are larger than the upper portions thereof. These spaces are used to store the fluid, introduced into the first sealing portion 170a and the second sealing portion 170b.

Meanwhile, each of the first and second sealing portions 170a and 170b according to this embodiment may each form at least one extension recess 172 in order to prevent the movement of the fluid, flowing into the first and second sealing portions 170a and 170b. FIG. 3 illustrates a state in which the respective extension recesses 172 are formed in the first sealing recess 171a and the second sealing recess 171b of the sleeve 113.

The extension recesses 172 according to this embodiment are continuously formed along the outer circumferential surface of the sleeve 113. When the extension recesses 172 are formed, the respective spaces of the first and second sealing portions 170a and 170b are significantly extended due to the extension recesses 172. Therefore, the fluid, flowing into the first and second sealing portions 170a and 170b, is not easily moved due to the greater interfaces thereof. As a result, it is possible to prevent the fluid from leaking down from the first and second sealing portions 170a and 170b.

According to this embodiment, a case in which the extension recesses 172 are continuously formed in the outer circumferential surface of the sleeve 113, that is, in the first sealing recess 171a and the second sealing recess 171b, is exemplified. However, the present invention is not limited thereto. The extension recesses 172 may be formed at any place inside the first sealing portion 170a and the second sealing portion 170b.

Furthermore, in this embodiment, the extension recesses 172, which are continuously formed along the outer circumferential surface of the sleeve 113, are exemplified. A plurality of extension recesses may be discretely formed at various positions. Various types of applications are possible.

The cover 150 according to this embodiment has a circular ring shape. Unlike the above-described embodiment in which the outer edges of the cover 150 are angulated, the cover 150 has curved outer edges. In particular, the surface of the cover 150 that faces the sleeve 113 has an arc shape. Therefore, the cover 150 according to this embodiment is attached to the rotor main wall 148 such that the most protruding point of the arc-shaped portion of the cover 150 may be the most adjacent to the outer circumferential surface of the sleeve 113. Here, the cover 150 is disposed to be adjacent to the outer circumferential surface located between the first sealing recess 171a and the second sealing recess 171b of the sleeve 113, thereby forming the second sealing portion 170b. Meanwhile, like the above-described embodiment, the cover 150 according to this embodiment may also be formed of a transparent material.

Since the motor 200 according to this embodiment that has the above-described configuration uses the first sealing recess 171a and the second sealing recess 171b, formed in the sleeve 113, the first sealing portion 170a and the second sealing portion 170b can have larger spaces to thereby enhance sealing effects.

Figure 4:
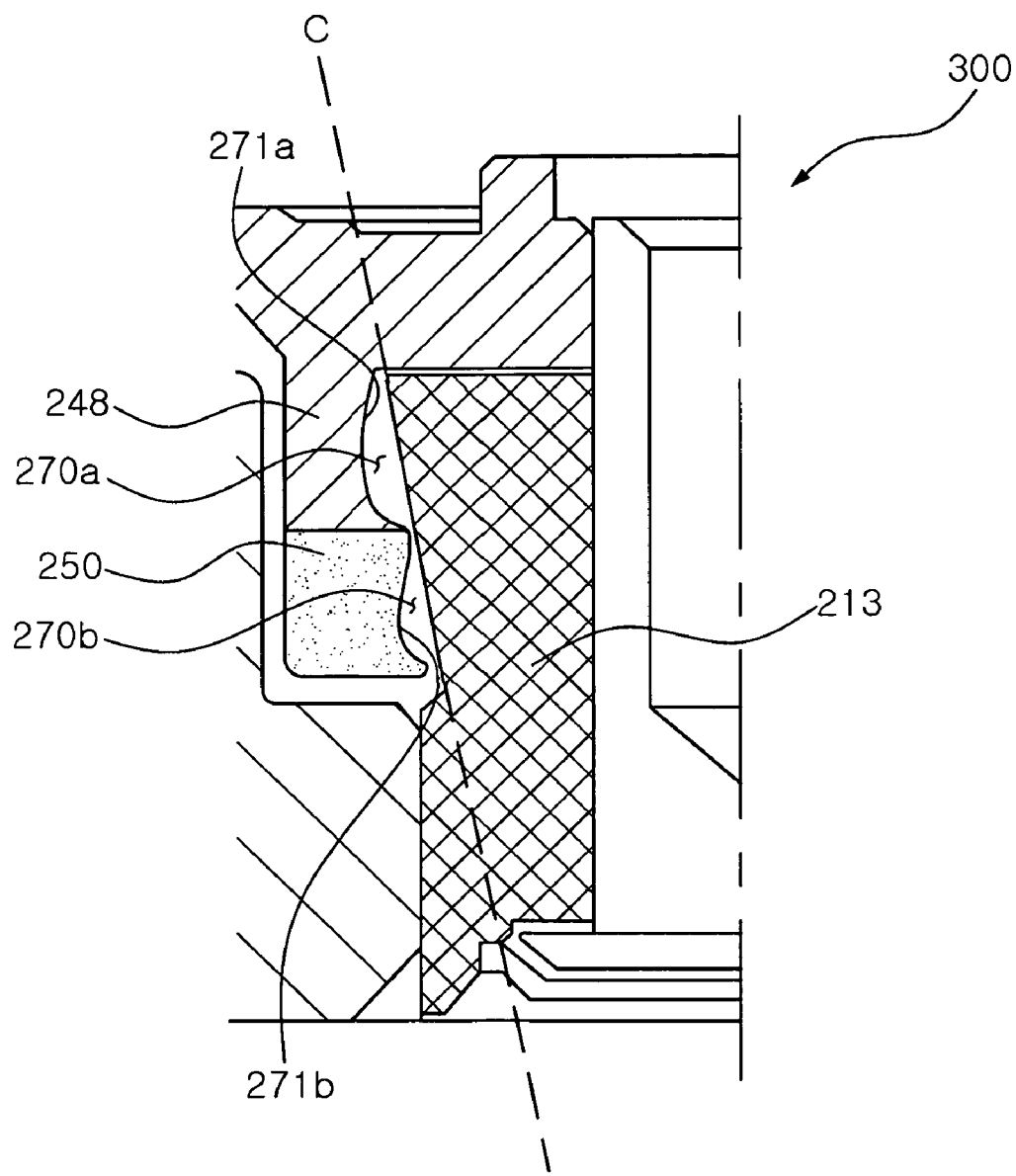
FIG. 4 is a schematic sectional view illustrating a motor according to another exemplary embodiment of the present invention.

FIG. 4 is a schematic sectional view illustrating a motor according to another exemplary embodiment of the invention.

A sleeve 213 of a motor 300 according to this embodiment has the same configuration as the sleeve 113 as shown in FIG. 2. A first sealing recess 271a and a second sealing recess 271b are formed in an inner circumferential surface formed by a rotor main wall 248 and a cover 250. Like the embodiment, shown in FIG. 3, the first sealing recess 271a and the second sealing recess 271b are formed to ensure spaces for a first sealing portion 270a and a second sealing portion 270b, respectively, and are continuously formed along the rotor main wall 248 and the inner circumferential surface of the cover 250.

Each of the first sealing recess 271a and the second sealing recess 271b increases in depth downward in an axial direction. For these reasons, the first sealing portion 270a and the second sealing portion 270b have spaces whose lower portions are greater than the upper portions thereof. These spaces are used to store the fluid, introduced into the first sealing portion 270a and the second sealing portion 270b, therein.

The motor 300 according to this embodiment that has the above-described configuration uses the first sealing recess 271a and the second sealing recess 271b formed in the rotor main wall 248 and the cover 250. Therefore, as in the configuration of FIG. 3, the first sealing portion 270a and the second sealing portion 270b have greater spaces to thereby enhance sealing effects.

Meanwhile, the motor 300 according to this embodiment is not limited to the above-described embodiment. Various kinds of applications are possible. For example, the first sealing recess may be formed in the sleeve, while the second sealing recess may be formed in the cover. The opposite is also possible. The first sealing portion may be configured by forming the first sealing recess in the inclined portion of the sleeve or the rotor main wall. The second sealing portion may be configured by forming the second sealing recess in any one of the inclined portion of the sleeve and the rotor main surface. Alternatively, first sealing recesses may be respectively formed in both the rotor main wall and the sleeve, and second sealing recesses may be respectively formed in both the cover and the sleeve.

Figure 5:
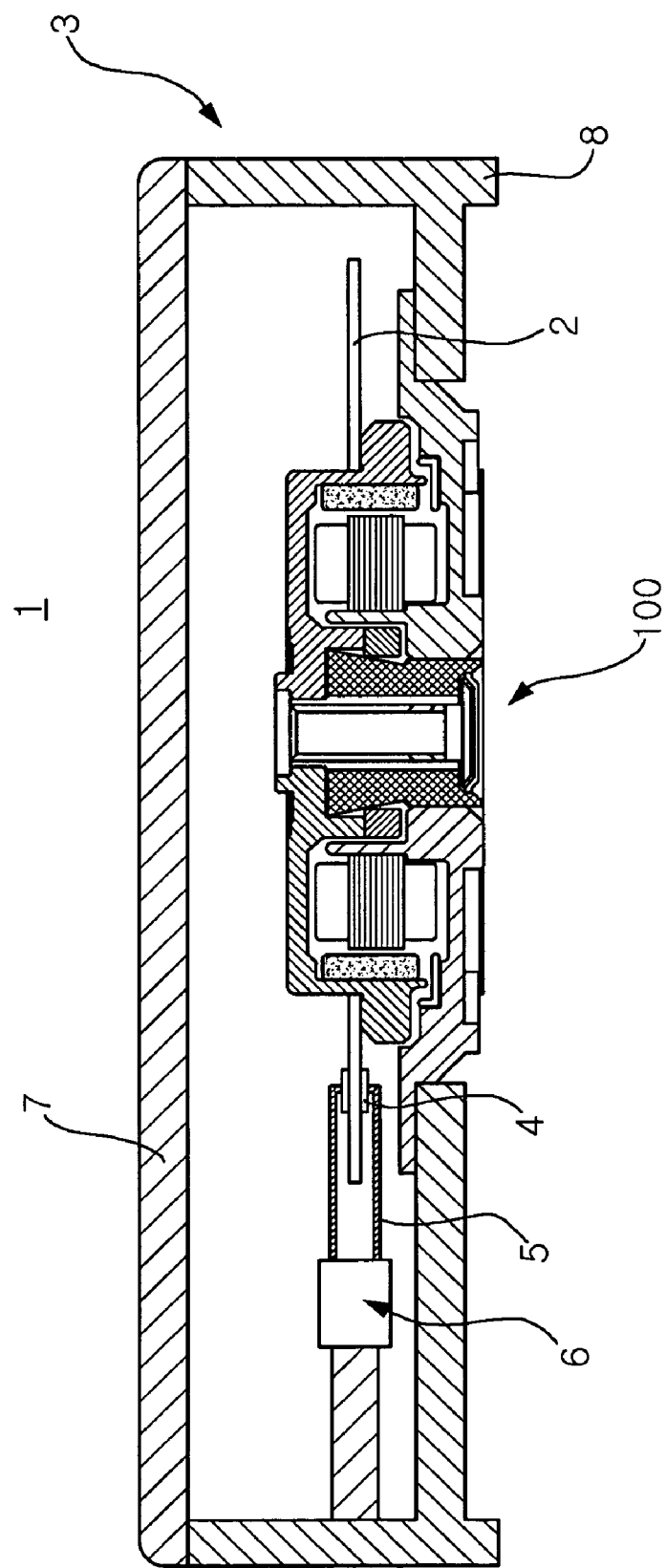
FIG. 5 is a schematic cross-sectional view illustrating a recording disc drive apparatus having a motor being mounted thereon according to an exemplary embodiment of the present invention.

FIG. 5 is a schematic perspective view illustrating a recording disc drive apparatus on which a motor according to an exemplary embodiment of the invention is mounted.

Referring to FIG. 5, a recording disc drive apparatus 1 according to this embodiment is a hard disk drive apparatus that includes a motor 100, a head transfer unit 6, and a housing 3.

The motor 100 may be one of the above-described motors 100, 200, and 300, and has a recording disc 2 mounted thereon.

A head transfer unit 6 transfers a head 4, which reads information on the recording disc 2 mounted on the motor 100, to a surface of the recording disc 2 to be read. The head 4 is disposed on a support 5 of the head transfer unit 6.

The housing 3 may include a motor-mounted plate 8 and a top cover 7 shielding an upper part of the motor-mounted plate 8 in order to form an internal space that receives the motor 100 and the head transfer unit 6.

The motor and the recording disc drive apparatus according to the present invention are not limited to the above-described embodiments. While the present invention has been shown and described in connection with the exemplary embodiments, it will be apparent to those skilled in the art that modifications and variations can be made without departing from the spirit and scope of the invention as defined by the appended claims.

For example, in the above-described embodiments, the use of two sealing portions is exemplified. However, the present invention is not limited thereto. Three or more sealing portions may be formed. Various numbers of sealing portions of various kinds may be arranged in a straight light.

Also, in the above-described embodiments, a case in which a single sealing portion is formed in each of a rotor main wall and a cover is exemplified. However, the present invention is not limited thereto. Two sealing portions may be formed in either the rotor main surface or the cover. Various applications are possible.

Also, in the above-described embodiments, a motor, which is provided in a recording disc drive apparatus (for example, a hard disk drive), is exemplified. Various types of motors having a bearing that utilizes fluid dynamic pressure can be used.

As set forth above, according to exemplary embodiments of the invention, as at least two sealing portions, which are continuously formed in order to extend a passage through which a fluid is discharged, are provided, the fluid can be doubly prevented from leaking outside a bearing assembly.

Therefore, it is possible to reduce failures of a motor or a recording disc drive apparatus caused by fluid leaks.

What is claimed is:

1. A motor comprising:
a shaft;
a sleeve having a cylindrical shape and supporting the shaft such that the shaft is rotatable therein;
a rotor case engaged with an upper end of the shaft and having a rotor main wall having a cylindrical shape and protruding from one surface thereof in order to receive part of the sleeve; and
a cover engaged with an end portion of the rotor main wall and extending the rotor main wall,
wherein at least two sealing portions are formed continuously between an internal circumferential surface, defined by the rotor main wall and the cover, and an outer circumferential surface of the sleeve and prevent leakage of a fluid used to lubricate the sleeve.

2. The motor of claim 1, wherein the at least two sealing portions are provided in a straight line.

3. The motor of claim 1, wherein the sleeve, received in the rotor mail wall, increases in outside diameter in an upper axial direction.

4. The motor of claim 2, wherein the at least two sealing portions comprise:
   a first sealing portion comprising a space between the rotor main wall and the sleeve; and
   a second sealing portion comprising a space between the cover and the sleeve.

5. The motor of claim 4, wherein the first sealing portion is a space formed by a first sealing recess provided in any one of the sleeve and the rotor main wall.

6. The motor of claim 4, wherein the second sealing portion is a space formed by a second sealing recess provided in any one of an inclined portion of the sleeve and the cover.

7. The motor of claim 5, wherein the first sealing recess increases in depth toward a lower part thereof.

8. The motor of claim 6, wherein the second sealing recess increases in depth toward a lower part thereof.

9. The motor of claim 2, wherein the at least two sealing portions each comprise at least one extension recess provided in at least any one of the outer circumferential surface of the sleeve and the internal circumferential surface, defined by the rotor main wall and the cover, in order to extend respective spaces of the sealing portions.

10. The motor of claim 1, wherein the cover is formed of a transparent material.

11. A recording disc drive apparatus comprising:
    a motor according to claim 1;
    a head transfer unit transferring a head detecting information on a recording disc to be mounted on the motor to the recording disc; and
    a housing receiving the motor and the head transfer unit.

* * * * *